This invention relates to fluid heaters and particularly to a tubing arrangement used when supporting the lower furnace wall tubes of a steam generator from the upper furnace wall tubes of the steam generator in a unit in which the furnace wall circuit contains a fluid mixing header.

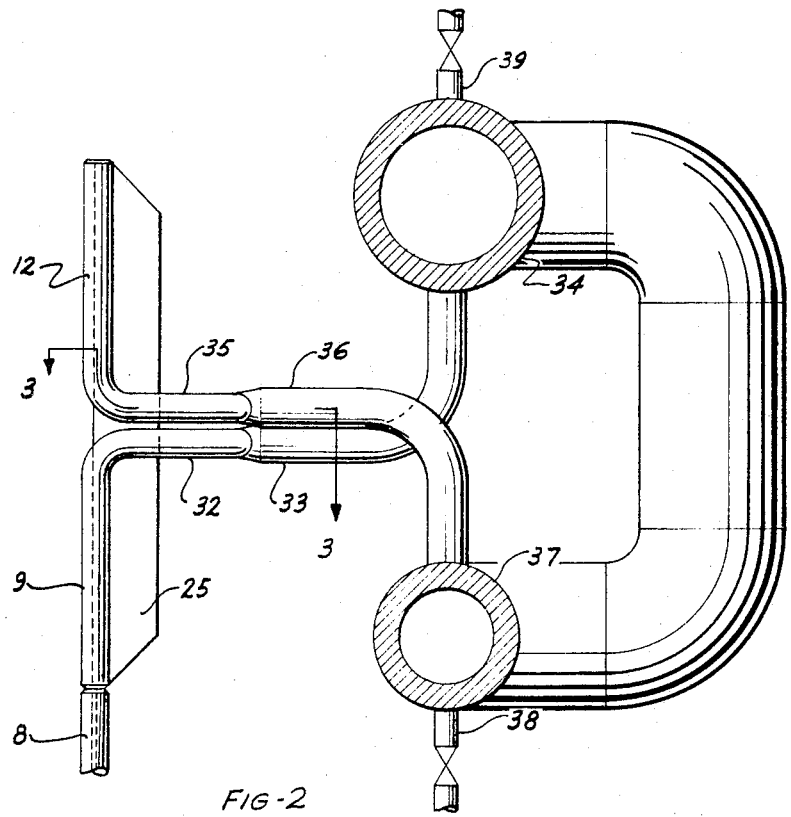
FIG-2
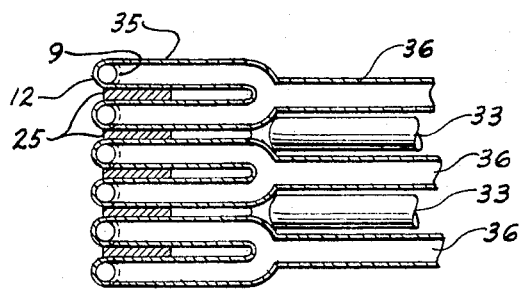
FIG·3
WILLBURT W. SCHROEDTER
INVENTOR.
BY E L Kochey
agent «3,280,799
FLUID HEATER SUPPORT ARRANGEMENT
Willburt W. Schroedter, West Hartford, Conn., assignor to Combustion Engineering, Inc., Windsor, Conn., a corporation of Delaware
Filed Aug. 26, 1965, Ser. No. 482,683
4 Claims. (Cl. 122—6)

All large steam generators are of the top supported design. Building steel supported on the ground is erected so that it passes over the steam generator with the upper portion of the steam generator being supported from this building steel. In these steam generators, which have vertical furnace wall tubes lining the walls of the furnace, the load of the lower portions of the furnace structure including burners, insulation, casing, etc. is carried by these vertical tubes.

In a once-through steam generator as the fluid is passed upwardly through the tubes of the furnace walls, the temperature of the fluid is increased due to heat transfer from the combustion process occurring within the furnace. However, due to the uneven distribution of the heat transfer within the furnace, varying amounts of heat are picked up in different tubes. Therefore, the temperature of the fluid leaving the furnace wall tubes varies from tube to tube. This unbalance is magnified by the fact that the specific volume of the fluid with more than average absorption increases which in turn tends to decrease the flow in that particular tube. With the decreased flow the fluid temperature further increases and also its specific volume until an equilibrium condition is reached. Although this phenomena generally does not occur to such an extent that the flow in the tube becomes completely unstable, it does operate to magnify the temperaure unbalance problem.

Obviously, one of the parameters which determine this unbalance is the amount of heat picked up in a single pass. In order to reduce the unbalances occurring in the furnace wall tubes, mixing headers have been introduced at a location within the furnace walls. The fluid then leaving the lower section of furnace wall tubes is mixed in this header so that it enters the upper section with an unbalance greatly decreased or eliminated, thereby decreasing the temperature unbalance at the outlet of the furnace wall.

In order to obtain this mixing the furnace wall tubes must be bent outwardly from the furnace wall and run to a mixing header. Since these furnace walls are structural members carrying vertical loads, a design must be developed to transfer the loading from the upper furnace wall tubes to the lower furnace wall tubes.

A large percentage of the heat absorbed in the furnace is absorbed in the lower portion of the furnace in the area of the burners. In order to obtain a good location for the mixing header with respect to the amount of heat picked up, it is desirable to locate this header at a relatively low elevation, down almost as far as the burners, if possible. In these areas, however, the heat absorption rate in the furnace walls is quite high. Therefore, structural members which form a portion of the furnace wall are preferably so designed that all parts are properly cooled and maintained at design conditions by the fluid cooled tubes. Otherwise excessive fin lengths may produce metal temperatures which excessively reduce their cohesive strength.

Heated tubing sections should generally be both drainable and ventable. If the circuit is not drainable, solids will collect in the lower portion during cleaning of the unit. These solids tend to form a scale on the inner surface of the tube insulating the metal from the fluid passing therethrough. This internal insulating layer results in extremely high metal temperatures and subsequent tube failures at that location.

When a circuit consisting of parallel tubes is not ventable, air or nitrogen pockets form in the inverted loop. This air loop can completely block flow in particular tubes unless the pressure drop through the circuit is sufficient to clear the loop. If the tube is completely blocked, of course, there is no flow and when the unit is fired, the tube overheats and fails.

My invention particularly relates to a support arrangement as disclosed in a simultaneously filed application by Carl W. Lawton wherein a vertical bar is located intermediate adjacent tubes and extends upwardly passing between the tubes of the upper and lower sections. This bar replaces the fin which is welded intermediate these tubes and is securely welded to the adjacent tubes as well as the fin above and below the bar. The tubes as they are bent outwardly from the furnace are seal welded to the bar and to each other. The vertical load is, therefore, transmitted from the upper tubes and webs to the vertical bar, through the vertical bar and to the webs and tubes of the lower section. In my invention the tubes from the lower furnace wall section which are bent outwardly, are divided into pairs of tubes which are then bifurcated to single tubes that pass to an upper header. Tubes of the upper section are also bifurcated to a single tube after being bent outwardly from the furnace wall and pass to a lower header. The pairing of the tubes for bifurcating purposes in the adjacent sections are offset one tube so that the single tubes of the sections are in alternate spaces. This permits them to pass one another without horizonal offsetting.

It is an object of my invention to provide a tubing arrangement for a mixing header system which avoids complicated tube bending.

It is a further object to provide a mixing header arrangement which permits the headers to be located close to the furnace walls.

It is a further object to provide a mixing header arrangement which is both drainable and ventable.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawing wherein:

FIG. 2 is a side elevation showing a detail of the tubing system at the mixing header location; and FIG. 3 is a sectional view taken through 3—3 of FIG. 2.

Figure 1:
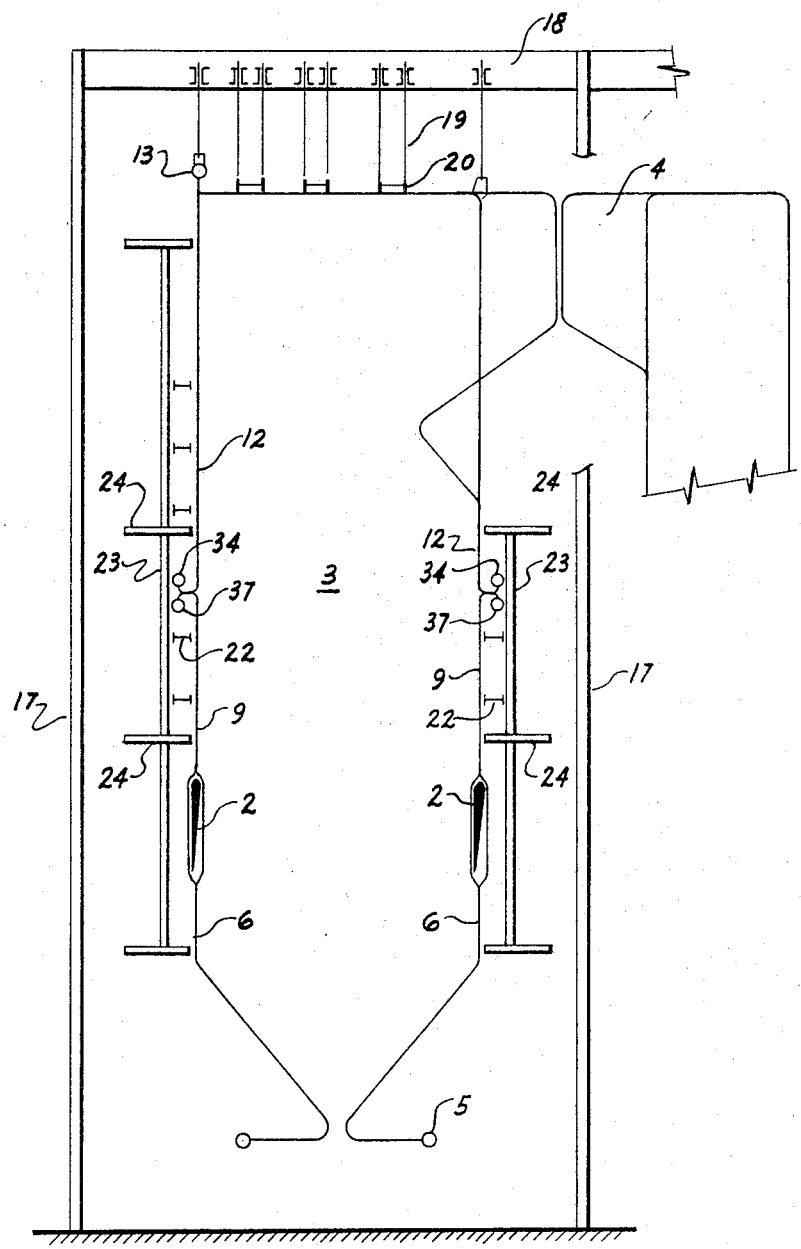
FIG. 1 is a side elevation of a steam generator showing the general method of support.

In the illustraiton of FIG. 1 fuel is introduced through burners 2 into the furnace 3 where combustion takes place with the combustion products passing outwardly from the furnace through flue 4. Feedwater to the steam generator passes from the economizer (not shown) to the furnace wall inlet headers 5. It passes upwardly through tubes 6 lining the walls of the furnace 3. These tubes are 1¼ inch outside diameter and a ¼ inch thick and ½ inch wide web 8 intermediate adjacent tubes, and welded to the adjacent tubes.

The tubes pass from the lower furnace wall section 9 and are bent outwardly to the mixing header arrangement. Tubes for the upper furnace walls 12 egress from the mixing header arrangement and pass upwardly along the furnace walls to the furnace wall outlet header 13. The steam passes from the furnace wall outlet header 13 to the superheaters (not shown) and then to a steam turbine (not shown) for the generation of electric power. The building steel verticals 17 support building steel horizontals 18 from which the steam generator is supported. Tie rods 19 support the upper furnace walls through lugs 20 from the horizontal building steel 18. These lugs 20 are securely welded to the furnace wall tubes with the weight of the steam generator structure then being carried on these tubes.

A portion of the buckstay framing system is also shown in FIG. 1. Because of the pressure existing within the furnace not only during normal operation but on occasions when a slight furnace puff may occur, the furnace walls must be bucked up with a relatively rigid staying structure. This is accomplished by locating horizontal buckstays 22 on 6 ft. centers and attaching them to the tubes so that they resist forces which are directed outwardly from the furnace. The loads imposed on these horizontal buckstays are transmitted to the vertical buckstays 23 which collect the load from all of the horizontal buckstays and transmits it into the horizontal trusses 24. The horizontal trusses 24 on opposite sides of the furnace are tied together so that they oppose one another when pressure exists within the furnace.

It is desirable to locate the vertical buckstays 23 relatively close to the furnace walls such as 2 ft. because there are a large number of stirrups tying the walls to the horizontal buckstays 22 and these, in turn, must be tied to the vertical buckstays 23. Excessive lengths in these stirrups or ties increases costs and increases the possibility of undesirable bending stresses in the ties. A flat bar 25 is located so that it runs intermediate adjacent tubes throughout a 24 inch distance. This bar is securely welded to the tubes on either side of the bar as well as to the web above the bar. The welding is continued to the bar as the tubes bend outwardly from the furnace throughout a portion of the 90° bend. In order to make the joint gas tight, the upper and lower tubes must be welded together. The weld between the bar and the tube is continued between the upper and lower tubes so as to completely seal the space between the tubes.

FIGS. 2 and 3 show a detail of the furnace wall arrangement in the area of the mixing header arrangement. The lower furnace wall tubes 9 are 1¼ inch tubes on 1¾ inch spacing with webs 8 welded intermediate the tubes. These tubes are bent at 90° outwardly from the furnace to form horizontal tube section 32. Each pair of two 1¼ inch tubes is then bifurcated to form a single 1½ inch tube 33. This single tube 33 is then bent upwardly 90° entering into the lower furnace wall outlet header 34.

The upper furnace wall tubes 12 are also bent outwardly from the furnace at this same general location forming horizontal section tubes 35. These tubes are bifurcated so that pairs of the 1¼ inch tubes 24 form single horizontal tubes 36. The paired tubes selected from the upper furnace wall tubes 12 are staggered one tube from the lower furnace wall tubes 9. With this arrangement the single tubes 33 and 36 are in alternate spaces so that tube 36 may be bent downwardly to the upper furnace wall inlet header 37 without offsetting to avoid interference with tubes 34.

Headers 34 and 37 are connected by means of external piping 40 in a loop, carrying fluid from header 34 to header 37. Drain line 38 is located in header 37 and vent 39 is located in header 34. The entire system including the horizontal portions of the tubes is therefore both ventable and drainable avoiding the problems inherent in non-drainable and non-ventable sections.

Physical problems in forming bends in tubing require a reasonable straight on each side of the bend so that the tubing may be properly clamped to perform the bending operation. Systems which require multiple bends in order for tubing to enter headers therefor require a considerable distance. In the instant arrangement after the bend, which carries the tubes out of the furnace wall, only a bifurcate and a single 90° bend are required. In the instant embodiment the bends which take the 1¼ inch tubes out of the furnace wall plan are 1½ inch radius bends while the bend which carries the single tubes to the headers is a 3½ inch radius bend. With such an arrangement the distance between the centerline of the furnace and the centerline of the header is held to 14 inches. With an 8⅝ inch outlet header 34 the over-all distance from the centerline of the furnace wall tubes to the outside edge of the header does not exceed 19 inches.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a fluid heater having a furnace, generally vertical tubes including a lower section and an upper section lining the walls of said furnace, a mixing header system receiving fluid from said lower section and discharging the mixed fluid to the upper section, with said lower section being supported from said upper section, an improved junction arrangement comprising: lower horizontal sections formed by bending outwardly at an angle of 90° from the furnace the upper ends of the tubes forming said lower section; lower single tubes formed by joining pairs of adjacent tubes of said lower horizontal section; said lower single tubes passing upwardly to connect with the mixing header system at an upper elevation; upper horizontal sections formed by bending outwardly at an angle of 90° from the furnace the lower ends of the tubes forming said upper section; upper single tubes formed by joining pairs of adjacent tubes of said upper section, with said upper single tubes being on alternate spacing with respect to the lower single tubes, passing downwardly and connecting to the mixing header system at a lower elevation, with said upper single tubes passing intermediate said lower single tubes.

2. An apparatus as in claim 1 wherein the symmetrical bifurcates are employed to join the pairs of tubes, forming single tubes; and the pairs of tubes selected from said upper section and said lower section for bifurcating are alternately selected so that the lower single tube passes intermediate the upper single tube with each tube remaining in a single vertical plane.

3. In a fluid heater having a furnace, generally vertical tubes including a lower section and an upper section lining the walls of said furnace, and having webs intermediate adjacent tubes welded to the adjacent tubes, a mixing header system receiving fluid from said lower section and discharging the fluid to said upper section, means for supporting said lower section from said upper section, an improved junction arrangement comprising: lower horizontal sections formed by bending outwardly at an angle of 90° from the furnace the upper ends of the tubes forming said lower section; a single outlet tube formed by bifurcating each pair of adjacent lower horizontal section tubes, with said single outlet connecting to the mixing header system at an upper elevation; an upper horizontal section formed by bending outwardly from the furnace at an angle of 90° the lower ends of the tubes forming said upper section; a single inlet to the upper furnace wall section formed by bifurcating each pair of adjacent upper horizontal section tubes with said single inlet connecting to the mixing header system a lower elevation; the outside diameter of said inlet and outlet tubes being less than the centerline-to-centerline spacing tubes lining the walls of the furnace.

4. In a fluid heater having a furnace, generally vertical tubes including a lower section and an upper section lining the walls of said furnace, having webs intermediate adjacent tubes welded to the adjacent tubes, a mixing header system receiving fluid from said lower section and discharging the mixing fluid through the upper section and having said lower section supported from said upper section by rectangular support bars comprising at least a portion of the welded web, an improved junction arrangement comprising: a lower horizontal section formed by bending outwardly at an angle of 90° from the furnace at a location intermediate the rectangular support bar means the upper ends of the tubes comprising said lower section; a single outlet tube formed by bifurcating pairs of adjacent tubes of said lower horizontal section with said single outlet tube connecting to said mixing header system at an upper elevation; an upper horizontal section formed by bending outwardly from the furnace at an angle of 90° at a location intermediate the ends of said support bars the lower ends of the tubes forming said upper section; inlet tubes formed by bifurcating pairs of adjacent tubes of said upper horizontal section with said inlet tubes passing intermediate said outlet tubes and connecting to the mixing header system at a lower elevation.

References Cited by the Examiner
UNITED STATES PATENTS
3,237,612   3/1966   Koch et al. _____ 122—406

KENNETH W. SPRAGUE, *Primary Examiner.*

UNITED STATES PATENT OFFICE
CERTIFICATE OF CORRECTION

Patent No. 3,280,799                October 25, 1966

Willburt W. Schroedter

It is hereby certified that error appears in the above numbered patent requiring correction and that the said Letters Patent should read as corrected below.

Column 2, line 70, after "and", first occurrence, insert -- have --; column 4, line 75, after "system" insert -- at --.

Signed and sealed this 12th day of September 1967.

(SEAL)
Attest:

ERNEST W. SWIDER                EDWARD J. BRENNER
Attesting Officer                Commissioner of Patents